E. M. KNOLLIN.
COW-MILKERS.
No. 182,763. Patented Oct. 3, 1876.
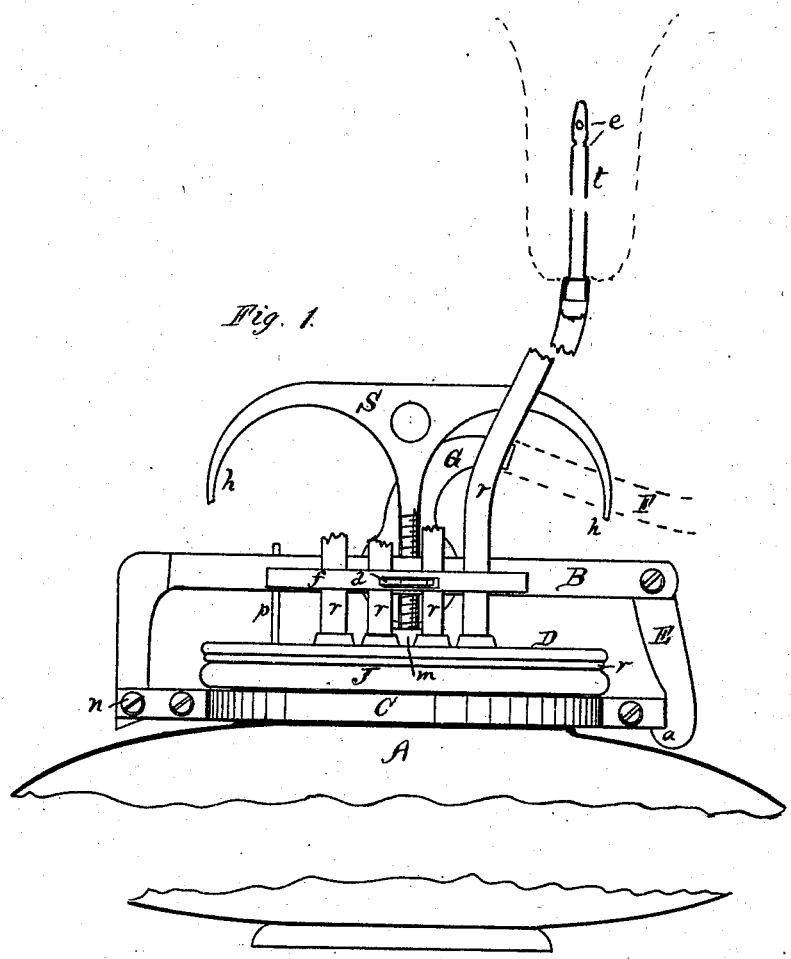
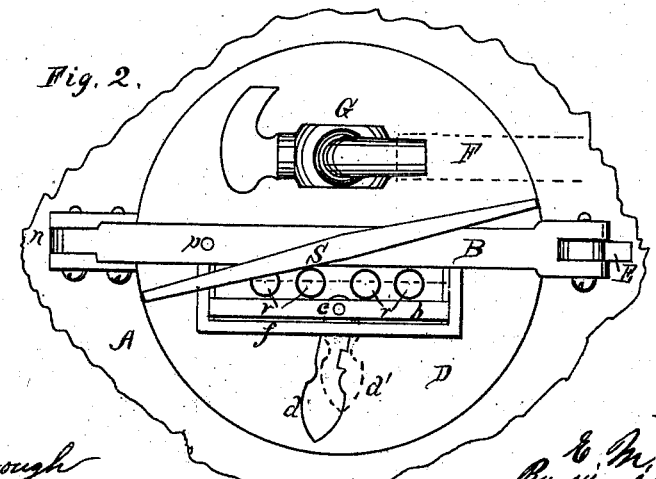
Witnesses.
W. G. Loughborough
G. B. Selden.
Inventor.
E. M. Knollin
By Wm. G. Loughborough
Atty

UNITED STATES PATENT OFFICE.

EDWARD M. KNOLLIN, OF SANDY CREEK, NEW YORK.

IMPROVEMENT IN COW-MILKERS.

Specification forming part of Letters Patent No. 182,763, dated October 3, 1876; application filed July 13, 1876.

*To all whom it may concern:*

Be it known that I, EDWARD M. KNOLLIN, of Sandy Creek, in the county of Oswego and State of New York, have invented certain new and useful Improvements in Cow-Milkers; and I do hereby declare that the following is a full, clear, and exact description thereof, reference being had to the accompanying drawings, making part of this specification, in which—

Figure 1 is a sectional elevation of my improved apparatus for milking cows. Fig. 2 is a top or plan view of the same.

The nature of this invention will be better understood by reference to the drawings and specifications.

I employ a vacuum-chamber, A, preferably formed of glass, though any other suitable material may be used. This chamber may be made of any desired size. It is made with a neck at the top, and a projecting flange, J. The collar C is formed in two parts, and secured to the neck of the chamber or vessel A by bolts or screws, as shown in Fig. 1, below the flange J. The yoke B is pivoted at one end to this collar at $n$. It is secured in its working adjustment, by means of the hook $a$, on the swinging latch E, catching under the projection on the opposite side of the collar. The cover or disk D is hung to the yoke B by means of the screw S, which is tapped through the yoke, and is swiveled to a plate, $m$, that is fixed to the cover. The latter is prevented from turning upon the screw by means of the dowel or guide-pin $p$, which is fixed to the cover, and fitted loosely through the yoke. The cock G is fitted air-tight through the cover, as are also the four short metal tubes, to which the four sections of flexible hose $r$ are attached. On the side of the yoke B is fixed a secondary yoke, $f$, to which is fitted a sliding clamping-bar, $b$, the ends of which slide on suitable ways formed upon the projecting arms of the yoke $f$. To the center of this bar $b$ is pivoted a sort of locking-latch, $d$, the outer end of which passes through a slot formed in the main bar of the yoke $f$.

When the latch $d$ is forced inward, and to the position shown in dotted lines $d'$, Fig. 2, the bar $b$ is firmly clamped against the flexible tubes $r$, and they are flattened, and their sides so pressed together as to effectually cut off the air-passage through them.

Each of the tubes $r$ is formed with a small hollow tip, $t$, formed of any suitable material, preferably of hard rubber.

Several holes, $e$, may be made near the end of each, as shown in Fig. 1, and one exactly in the end. The latter might prove sufficient of itself.

The chamber A is exhausted by an ordinary air-pump after closing the tubes or pipes $r$ by the bar $b$, as before described, and attaching the vessel or chamber to the pump, which may be done by a section of flexible hose, as indicated by the dotted lines F, and when it is thus thoroughly exhausted the cock G is closed. The apparatus is then suspended to the cow just in front of the bag, where it may be held by a strap passing over her back, and having its ends hooked to the points $h$ of the screw. It is so suspended with the tubes $r$ and their tips $t$ toward the bag, or rearward with relation to the screw S. The tips $t$ are then inserted, one in each teat, and the suction let on by placing the latch $d$ and bar $b$ in the position shown in full lines in Fig. 2. The vacuum causes the milk to flow into the chamber, which should be large enough to hold what a cow would ordinarily give at a milking. When it is filled, or has taken what it will, it is detached and emptied, which latter is done by unhooking the latch E, and swinging the top D over to the left. After being emptied it is again closed, exhausted, and applied as before.

By having several of these vacuum-chambers, when the attendant is emptying, exhausting, and applying one, the others may be at work or milking.

A cam-lever may be substituted for the screw S, for clamping the cover down upon the packing, &c.

A similar cam-lever might also be employed to close the tubes $r$.

If the screw S is dispensed with, the collar C may be provided with a hook on each of two opposite sides to receive the hanger-strap.

What I claim as my invention is—

1. In combination with a vacuum-chamber, A, and flexible pipes $r$ and tips $t$, the clamping-bar $b$, substantially as and for the purposes set forth.

2. In a milking apparatus, a previously-exhausted air-chamber, A, provided with flexible tubes $r$, tips $t$, and cock G, for the purposes set forth.

E. M. KNOLLIN.

Witnesses:
 WM. S. LOUGHBOROUGH,
 A. L. MABBETT.